US009660838B2

(12) United States Patent
Ji et al.

(10) Patent No.: US 9,660,838 B2
(45) Date of Patent: May 23, 2017

(54) DEVICE AND METHOD FOR ADAPTIVE CHANNEL ESTIMATION

(71) Applicant: APPLE INC., Cupertino, CA (US)

(72) Inventors: Zhu Ji, San Jose, CA (US); Johnson O. Sebeni, Fremont, CA (US); Navid Damji, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 70 days.

(21) Appl. No.: 14/290,433

(22) Filed: May 29, 2014

(65) Prior Publication Data

US 2015/0349979 A1  Dec. 3, 2015

(51) Int. Cl.
*H04W 4/00* (2009.01)
*H04L 25/02* (2006.01)
*H04W 4/06* (2009.01)
*H04L 27/26* (2006.01)
*H04L 12/18* (2006.01)
*H04L 5/00* (2006.01)

(52) U.S. Cl.
CPC ...... *H04L 25/0224* (2013.01); *H04L 27/2601* (2013.01); *H04W 4/06* (2013.01); *H04L 5/0048* (2013.01); *H04L 12/189* (2013.01)

(58) Field of Classification Search
USPC ................. 370/248, 252, 255, 328
See application file for complete search history.

(56) References Cited

U.S. PATENT DOCUMENTS

| 2013/0223256 A1* | 8/2013 | Choi | H04L 25/0224 370/252 |
| 2013/0235769 A1* | 9/2013 | Yuan | H04L 25/0202 370/280 |

* cited by examiner

*Primary Examiner* — Yemane Mesfin
*Assistant Examiner* — Mon Cheri Davenport
(74) *Attorney, Agent, or Firm* — Fay Kaplun & Marcin, LLP

(57) ABSTRACT

A method to be performed at a station configured to connect to a Long Term Evolution radio access network (LTE-RAN) to utilize enhanced Multimedia Broadcast Multicast Services using a Multicast-Broadcast Single-Frequency Network (MBSFN). The method including receiving a MBSFN subframe having a MBSFN subframe structure including a plurality of Orthogonal Frequency-Division Multiplexing (OFDM) symbols, a first one of the OFDM symbols having a first reference symbol inserted therein, a second one of the OFDM symbols having a second reference symbol inserted therein, determining a rate of change of channel conditions being experienced by the station and performing a non-destaggered channel estimation when the rate of change of channel conditions is greater than a predetermined threshold, the non-destaggered channel estimation using a first Channel Impulse Response (CIR) at the first OFDM symbol and a second CIR at the second OFDM symbol.

20 Claims, 8 Drawing Sheets

-PRIOR ART-

DEVICE AND METHOD FOR ADAPTIVE CHANNEL ESTIMATION

BACKGROUND INFORMATION

A station may establish a connection to a wireless communications network via a base station (e.g., an eNodeB (eNB) in Long Term Evolution (LTE) networks). To properly be prepared for demodulating transmitted signals (i.e., received signals), the station must be configured with proper settings.

Specifically, properties related to the physical layer of the transceiver used to connect to the network must be known. For example, the channel (e.g., band of frequencies) must be known for the incoming signal in order for it to be properly received. While connected to the network, reference symbols are transmitted from a base station of the network to the station. The reference symbols may be used as a basis for calculating a variety of wireless properties, in particular, for channel estimation.

Within the LTE networks, a particular channel used therein is a Multicast-Broadcast Single-Frequency Network (MBSFN). In the MBSFN, the channel impulse response (CIR) may be used as the basis for the channel estimation. A MBSFN subframe may be provided from the base station to the station that includes a plurality of orthogonal frequency-division multiplexing (OFDM) symbols. These OFDM symbols may be constructively organized into a grid based upon slot (i.e., time) and frequency. There may be reference symbols that are inserted at predetermined positions within the grid. In one particular example, when viewing a row of OFDM symbols from symbol 0 to symbol 11, the reference symbols may be positioned at symbols 2, 6, and 10 for the MBSFN. To estimate the channel using less processing, a destaggering manner is used in which the CIRs of symbols 4 and 8 are used for the channel estimation. However, when the station is in motion or otherwise experiences a Doppler effect, a relatively high Doppler effect in conjunction with the destaggering manner smears the channel variation over time and leads to inferior channel estimation results.

DETAILED DESCRIPTION

Figure 1:
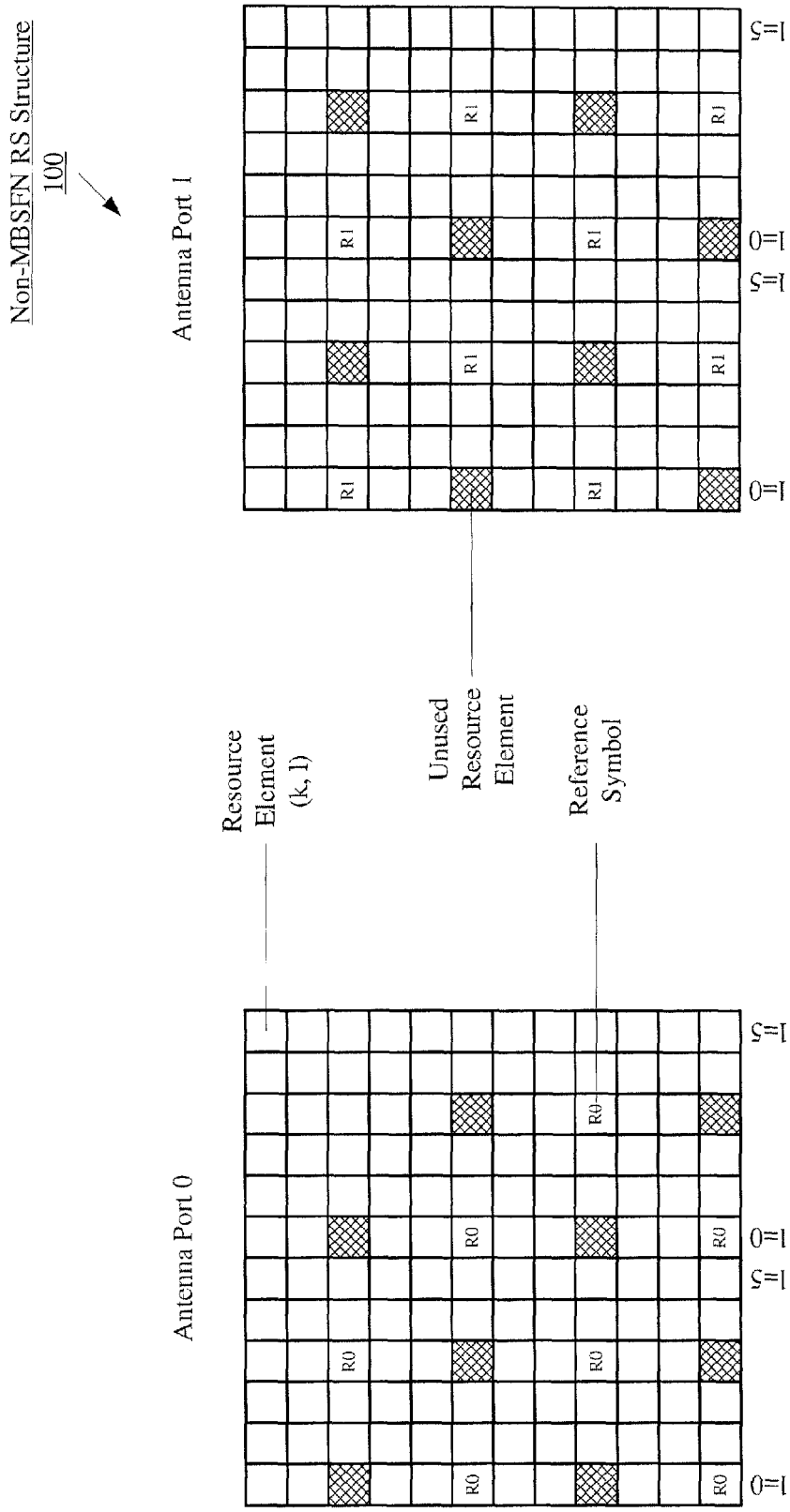
FIG. 1 shows an exemplary non-Multicast-Broadcast Single-Frequency Network reference symbol structure.

The exemplary embodiments describe a method to be performed at a station configured to connect to a Long Term Evolution radio access network (LTE-RAN) to utilize enhanced Multimedia Broadcast Multicast Services (e-MBMS) using a Multicast-Broadcast Single-Frequency Network (MBSFN). The method includes receiving a MBSFN subframe from an evolved NodeB (eNB) of the LTE-RAN, the MBSFN subframe having a MBSFN subframe structure including a plurality of Orthogonal Frequency-Division Multiplexing (OFDM) symbols, a first one of the OFDM symbols having a first reference symbol inserted therein, a second one of the OFDM symbols having a second reference symbol inserted therein, determining a rate of change of channel conditions being experienced by the station on a channel that the station is receiving a signal including the MBSFN subframe from the eNB; and performing a non-destaggered channel estimation when the rate of change of channel conditions is greater than a predetermined threshold, the non-destaggered channel estimation using a first Channel Impulse Response (CIR) at the first OFDM symbol and a second CIR at the second OFDM symbol.

The exemplary embodiments also describe a station having a transceiver configured to establish a connection to an access network and a processor. The processor and transceiver are configured to perform a channel estimation by receiving a subframe from a base station of the access network, the subframe including a plurality of symbols, a first one of the symbols having a first reference symbol inserted therein, a second one of the symbols having a second reference symbol inserted therein, receiving a rate of change of channel conditions for a channel on which the station is receiving the subframe from the base station, performing a non-destaggered channel estimation when the rate of change of channel conditions is greater than a predetermined threshold, the non-destaggered channel estimation using a first Channel Impulse Response (CIR) at the first symbol and a second CIR at the second symbol and performing a destaggered channel estimation when the rate of change of channel conditions is less than the predetermined threshold, the destaggered channel estimation using a third CIR at a third symbol, the third symbol being between the first and second symbols.

The exemplary embodiments further describe a non-transitory computer readable storage medium with an executable program stored thereon. The program instructs a microprocessor to perform operations including receiving a Multicast-Broadcast Single-Frequency Network (MBSFN) subframe from an evolved NodeB (eNB) of a Long Term Evolution radio access network (LTE-RAN), the MBSFN subframe having a MBSFN subframe structure including a plurality of Orthogonal Frequency-Division Multiplexing (OFDM) symbols, a first one of the OFDM symbols having a first reference symbol inserted therein, a second one of the OFDM symbols having a second reference symbol inserted therein, determining a rate of change of channel conditions being experienced by the station on a channel that the station is receiving a signal including the MBSFN subframe from the eNB and performing a non-destaggered channel estimation when the rate of change of channel conditions is greater than a predetermined threshold, the non-destaggered channel estimation using a first Channel Impulse Response (CIR) at the first OFDM symbol and a second CIR at the second OFDM symbol.

The exemplary embodiments may be further understood with reference to the following description and the related appended drawings, wherein like elements are provided with the same reference numerals. The exemplary embodiments are related to a station and method for an adaptive channel estimation used in a Multicast-Broadcast Single-Frequency Network (MBSFN). Specifically, the channel estimation may be performed based upon a variance in channel conditions being experienced by the station. One manner of determining the variance in the channel conditions is using Doppler estimations. When the Doppler effect is below a predetermined threshold, the channel estimation may be performed based upon a destaggered manner in which a channel impulse response (CIR) measured at an OFDM symbol between two OFDM symbols having reference symbols is used. When the Doppler effect is above the predetermined threshold, the channel estimation may be performed based upon an adaptive reference symbol manner in which a CIR measured at an OFDM symbol having a reference symbol is used.

Throughout this description, it will be described that the indication that channel conditions are rapidly changing is based on a Doppler estimation for the station. However, it should be understood that there may be other manners of determining that the station is experiencing rapidly changing channel conditions and these other manners may also be used in the same manner as the Doppler estimations as described herein. Some examples of other manners of determining that the station is experiencing rapidly changing channel conditions may include significant changes of the energy of CIR taps, significant SNR estimation changes over a short period of time, motion changes detected from motion sensors (such as accelerometer), a large timing change detected from the CIRs, etc.

A MBSFN is a transmission mode defined in the Long Term Evolution (LTE) specification in which enhanced multimedia broadcast multicast services (e-MBMS) are delivered. The e-MBMS may include, for example, mobile television streams.

Specifically, the MBSFN is a communication channel in the LTE network that delivers the e-MBMS services using the LTE infrastructure. The e-MBMS provides transport features for sending the same content to users in a cell. For example, a broadcast may be used when sending the content to all the users in the cell. In another example, a multicast may be used when sending the content to a given set of users in the cell. Due to the nature of the LTE network, it should be noted that the broadcast/multicast of the e-MBMS is different from Internet Protocol (IP) level broadcast and multicast which does not share resources on the radio access level. It should also be noted that the e-MBMS within the LTE network may utilize a single eNodeB (eNB) or multiple eNBs for transmissions to a plurality of users using broadcast or multicast. However, the MBSFN relates to the use of the multiple eNBs. Those skilled in the art will understand that the eNB is a network component of the LTE network that interfaces with the stations.

A transmission in the MBSFN exploits the orthogonal frequency-division multiplexing (OFDM) radio interface and the LTE frame structure. Specifically, the eNB may configure a specific set of subframes to be MBSFN subframes with configurable periodicity within a system information block (SIB). For a subframe that is configured for MBSFN, the 3GPP specification defines a MBSFN region and a non-MBSFN region. The specification states that a subset of the downlink subframes in a radio frame on a carrier supporting physical downlink shared channel (PDSCH) transmission can be configured as MBSFN subframes by higher layers. The 3GPP specification further indicates that the non-MBSFN region spans the first one or two OFDM symbols in the MBSFN subframe. In this manner, the OFDM symbols not used for the non-MBSFN region may be used by the MBSFN subframe. The exemplary embodiments will be described with reference to the MBSFN and non-MBSFM subframes defined by the current 3GPP specifications. However, it should be noted that the adaptive channel estimation described herein may also be applied to other types of subframes in accordance with the principles described herein.

Figure 2:
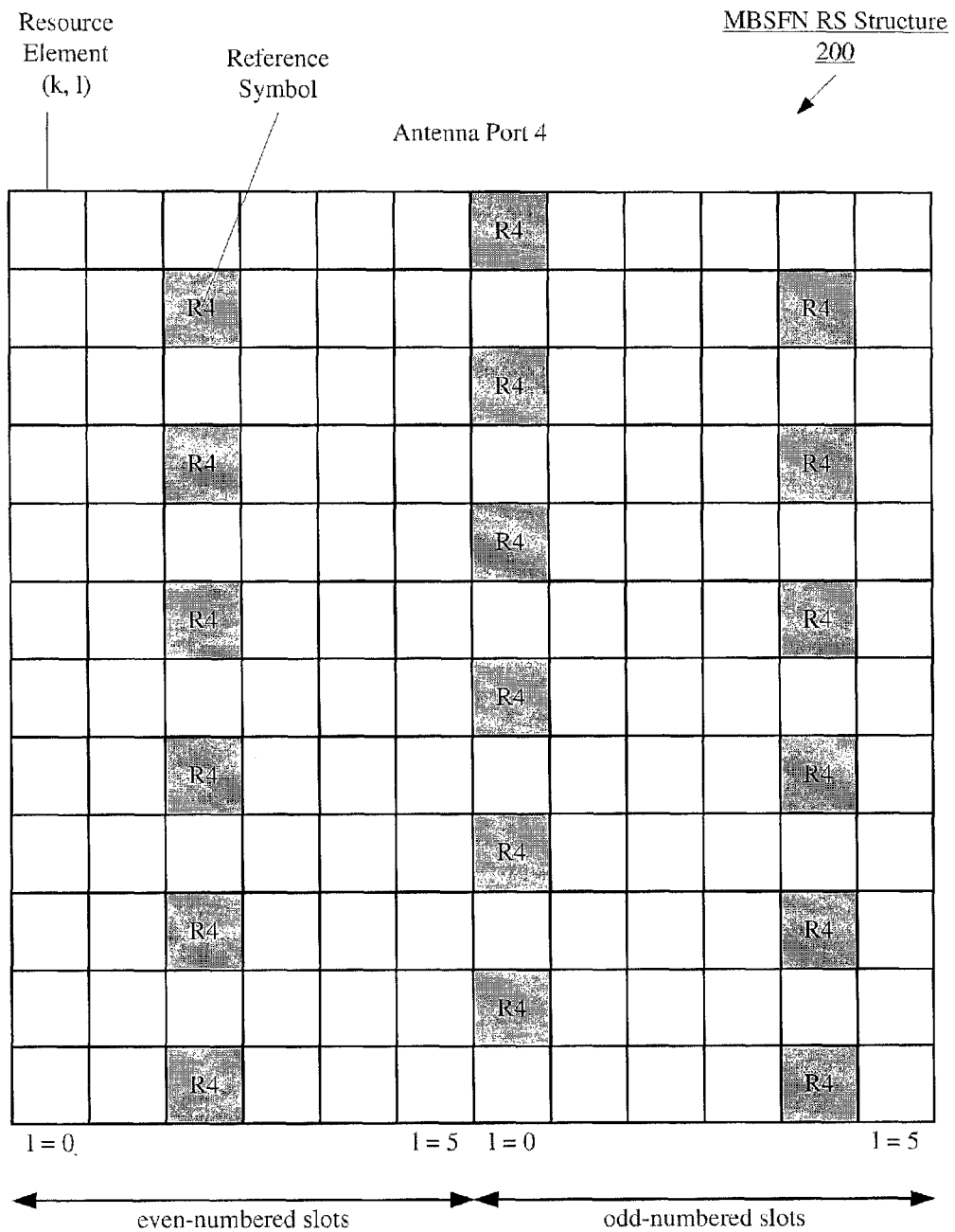
FIG. 2 shows an exemplary Multicast-Broadcast Single-Frequency Network reference symbol structure.

Using the configuration elements and the configuration field descriptions of the 3GPP specification, the reference signal structures for the MBSFN may be defined. Specifically, the MBSFN reference signal structure and the non-MBSFN reference signal structure may be defined in a constructive grid form. FIG. 1 shows an exemplary non-MBSFN reference symbol structure 100 while FIG. 2 shows an exemplary MBSFN reference symbol structure 200.

The non-MBSFN reference symbol structure 100 is illustrated in the above noted example of including two antennas. Specifically, a first antenna may be associated with an antenna port 0 while a second antenna may be associated with an antenna port 1. The non-MBSFN reference symbol structure 100 illustrates a first structure for the antenna port 0 and a second structure for the antenna port 1. These structures may indicate when a reference symbol is scheduled to be received within the duration of the subframe and the designated frequency at which the reference symbol is to be received at each antenna. Accordingly, the structure associated with the antenna port 0 utilizes reference symbols denoted as R0 while the structure associated with the antenna port 1 utilizes reference symbols denoted as R1.

Each structure may be divided into two slots, each slot including six OFDM symbols. As discussed above, MBSFN utilizes the extended cyclic prefix that uses one less OFDM symbol per slot. Those skilled in the art will understand that reference symbol structures for antennas that are not associated with MBSFN may use seven OFDM symbols per slot. Therefore, with MBSFN and the non-MBSFN reference symbol structure 100 being one component of MBSFN, each slot has a frequency domain spacing of six OFDM symbols relative to time. There may be a frequency domain staggering of two sub-carriers between the reference symbols in a slot. As illustrated, the reference symbols for the non-MBSFN reference symbol structure 100 may be received within a plurality of predetermined OFDM symbols. Specifically, reference symbols are inserted within the first (l=0) and fourth (l=3) OFDM symbols relative to time at known frequencies in the structure for the first slot of the antenna port 0. The same is also used for the second slot of the structure of the antenna port 0. The structure for the first and second slots of the antenna port 1 also have reference symbols inserted within the first (l=0) and fourth (l=3) OFDM symbols relative to time at known frequencies.

Furthermore, since a second antenna is also present, the structure for the antenna port 0 has frequencies in the select OFDM symbols that are blocked out as does the structure for the antenna port 1. Specifically, the OFDM symbol at a select frequency corresponding to the OFDM symbol for a reference symbol at the select frequency in the other structure is blocked out. That is, if a reference symbol is inserted for structure of the antenna port 0, the corresponding OFDM symbol in the structure of the antenna port 1 is blocked out and vice versa. Accordingly, the non-MBSFN reference symbol structure 300 shows the use of unused resource elements.

The MBSFN reference structure 200 is illustrated in the above noted example of including one antenna associated with an antenna port 4. The MBSFN reference structure 200 may also indicate when a reference symbol is scheduled to be received within the duration of the subframe and the designated frequency at which the reference symbol is to be received at each antenna. Accordingly, the structure associated with the antenna port 4 utilizes reference symbols denoted as R4. Again, MBSFN utilizes the extended cyclic prefix that uses one less OFDM symbol per slot such that the MBSFN reference symbol structure 200 includes two slots, each slot including six OFDM symbols. Specifically, the left slot may be for even-numbered slots while the right slot may be for odd-numbered slots. However, it should be noted that the MBSFN reference symbol structure 200 may also be viewed such that there is a total of twelve OFDM slots from l=0 to l=11 (as will be used below with regard to FIGS. 3 and 4).

There may be a frequency domain staggering of three sub-carriers between the reference symbols in the MBSFN reference symbol structure 200. As illustrated, reference symbols are inserted within the third (l=2) OFDM symbol of the left slot and within the first (l=0) and fifth (l=5) OFDM symbols of the right slot. In addition, the reference symbols may be inserted with a spacing therebetween with respect to frequency. Specifically, the reference symbols in the third OFDM symbol of the left slot and the reference symbols in the fifth OFDM symbol of the right slot utilize common frequencies while the reference symbols in the first OFDM symbol of the right slot utilizes frequencies that occupy the spacing between the reference symbols of the third OFDM symbol of the left slot.

Figure 3:
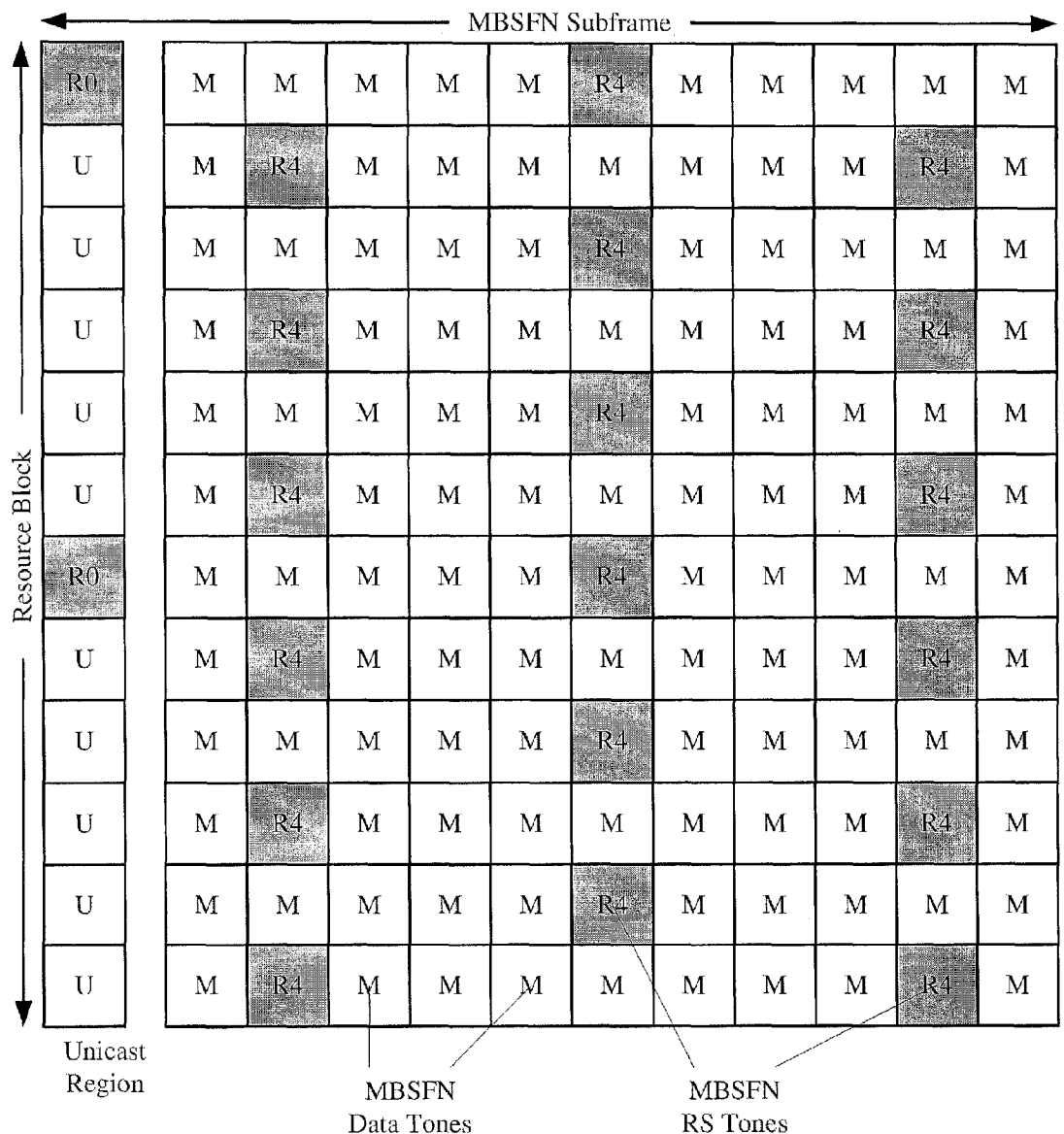
FIG. 3 shows an exemplary Multicast-Broadcast Single-Frequency Network subframe structure.

FIG. 3 shows an exemplary MBSFN subframe structure 300. Specifically, the MBSFN subframe structure 300 further shows the MBSFN subframe that includes a unicast region and a multicast region. The exemplary MBSFN subframe structure 300 will be described as twelve total OFDM symbols from l=0 to l=11. In a substantially similar manner as the non-MBSFN reference symbol structure 100 and the MBSFN reference symbol structure 200, the MBSFN subframe structure 300 includes resource blocks representing OFDM symbols based in time at various frequencies. As illustrated, the unicast region may be substantially similar to the first OFDM symbol of the first slot of the structure of the antenna port 1 in the non-MBSFN reference symbol structure 100. The multicast region may be substantially similar to the MBSFN reference symbol structure 200. Specifically, the MBSFN subframe structure 300 may include the unicast region at the first OFDM symbol (l=0) and the multicast region in the remaining second (l=1) to twelfth (l=11) OFDM symbols.

In more detail, the first OFDM symbol of the MBSFN subframe structure 300 has reference symbols R0 inserted at a middle frequency and a highest frequency. The remaining frequencies in the first OFDM symbol of the MBSFN subframe structure 300 may be occupied by unicast data tones. The second, fourth, fifth, sixth, eighth, ninth, tenth, and twelfth OFDM symbols of the MBSFN subframe structure 300 are all occupied by multicast data tones. The third and eleventh OFDM symbols of the MBSFN subframe structure 300 has reference symbols R4 inserted at a lowest frequency and every other higher frequency with a multicast data tone occupying the frequency space between reference symbols. The seventh OFDM symbol of the MBSFN subframe structure 300 has reference symbols R4 inserted at a highest frequency and every other lower frequency with a multicast data tone occupying the frequency space between reference symbols.

Using the MBSFN subframe structure 300 with the unicast symbol occupying OFDM symbol 0 and multicast symbols occupying OFDM symbols 1, 3-5, 7-9, and 11 with reference symbols being inserted at OFDM symbols 2, 6, and 10, a station is capable of determining its channel state information (CSI) relative to its receiver. The CSI relates to the channel properties of the communication link. With regards to the LTE network and the exemplary embodiments, the communication link may be for the MBSFN. Relative to the station, the CSI may provide information regarding a signal propagation from the transmitter of the base station to the receiver of the station. The information of the CSI enables the station to adapt transmissions to current channel conditions for the transmission to be performed. It should be noted that the transmitter (of the base station) and the receiver (of the station) may have different CSI due to a variety of factors such as scattering, fading, power decay, etc. Among the information provided by the CSI, a channel estimation may be performed based upon the CSI.

Figure 4:
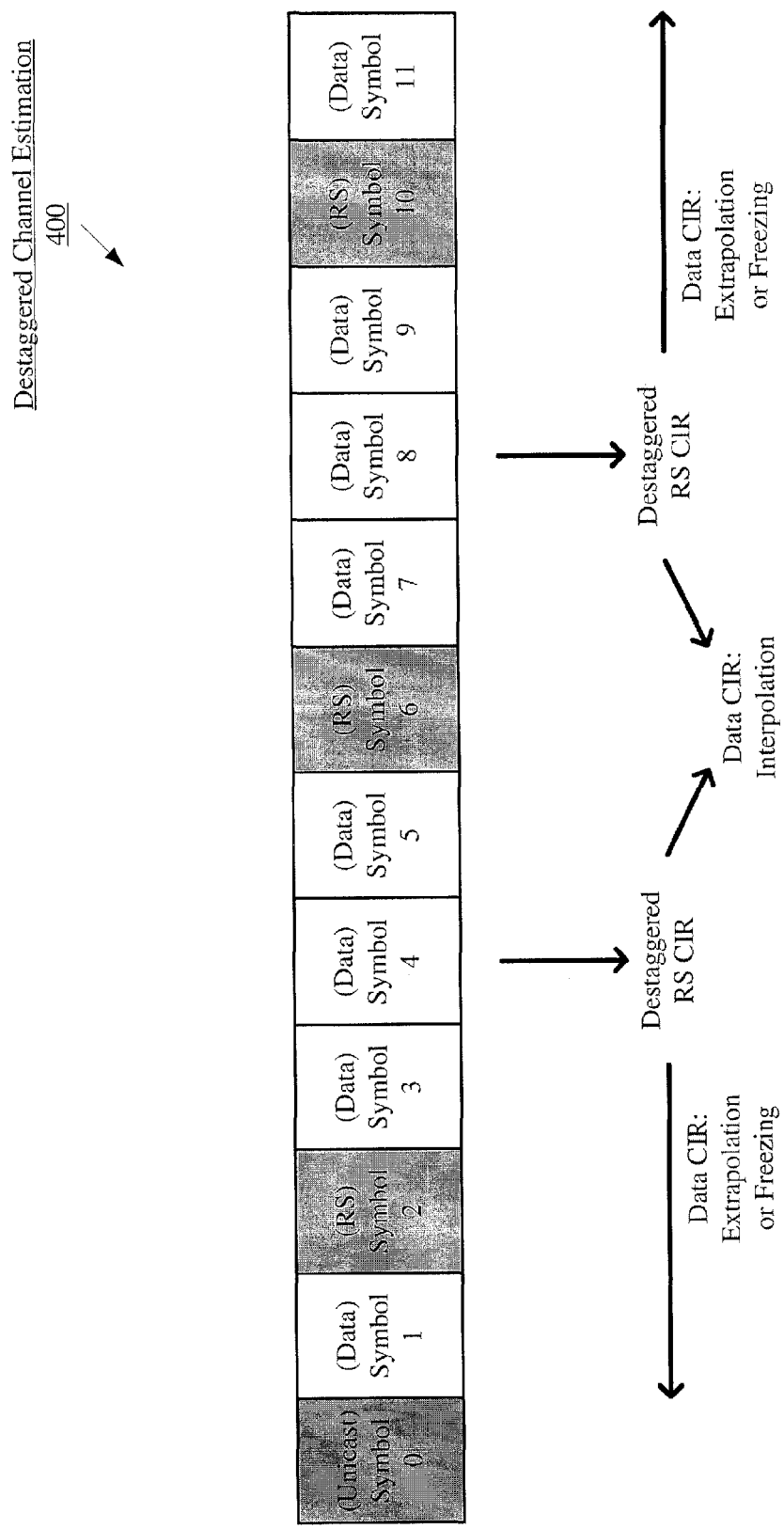
FIG. 4 shows an exemplary destaggered channel estimation method.

One specific channel estimation manner is a destaggered channel estimation method. One approach for MBSFN subframes is shown in FIG. 4 as a destaggered channel estimation method 400 in which the channel estimation is treated similarly as the channel estimation in regular subframes with cell-sounding reference signal (SRS). For example, in cell-SRS, the transmitter of the base station and the receiver of the station may be synchronized from the transmitter exciting or sounding the channel with a repeating pulse or tone. With MBSFN, a station destaggers a CIR from adjacent two reference symbols to construct a CIR with the effective timing at the middle of adjacent reference symbols. A CIR is an output when a brief input signal (i.e., an impulse) is received. That is, the CIR may be a reaction of the receiver of the station upon receiving the impulse from the transmitter of the base station. Thus, MBSFN subframe structure 300 with the unicast tones, the multicast tones, and the reference symbols may provide the impulses used to derive the CIRs.

In the case of the MBSFN subframe structure 300, two adjacent reference symbols may be those inserted at OFDM symbols 2 and 6 (or 6 and 10) such that the CIR at the middle corresponds to OFDM symbol 4 (or OFDM symbol 8). As such, the station may perform an Inverse Fast Fourier Transform (IFFT) for the OFDM symbols with MBSFN reference symbol signals and destaggers OFDM symbols 2 and 6 as well as symbols 6 and 10. Therefore, the station may have two destaggered CIRs at equivalent timing of OFDM symbol 4 and OFDM symbol 8. The channel estimation of other OFDM symbols in the multicast region may be obtained through interpolation, extrapolation, or freezing. Interpolation relates to a channel estimation process for OFDM symbols located between the measured CIRs (i.e, OFDM symbols between OFDM symbols 4 and 8, namely OFDM symbols 5-7) in which the CIR for each of these OFDM symbols are determined based upon the measured CIRs. Extrapolation relates to a channel estimation process for OFDM symbols not located between measured CIRs (i.e., OFDM symbols outside of OFDM symbols 4 and 8, namely OFDM symbols 1-3 and 9-11) in which the CIR for each of these OFDM symbols are determined based upon the respective measured CIRs. Freezing relates to a channel estimation process for OFDM symbols not located between measured CIRs (i.e., OFDM symbols outside of OFDM symbols 4 and 8, namely OFDM symbols 1-3 and 9-11) in which the CIR of each of these OFDM symbols are copied from a corresponding measure CIR.

This destaggered manner of channel estimation enables less processing to be performed by the station to determine this network parameter. Therefore, less power may also be utilized, particularly when the station has a limited power supply. However, there may be scenarios when the destaggered manner of channel estimation may be adversely affected from conditions being experienced by the station. Specifically, when the station is mobile and moving such that the station is experiencing a rapid change in channel conditions, the destaggered manner of channel estimations may not be the best manner of performing the channel estimations. One manner of determining the extent to which a station is experiencing changes in the channel condition is to use a Doppler estimation. When the Doppler estimation indicates rapidly changing channel conditions, the destaggered channel estimation method may lead to sub-optimal channel estimation results that may subsequently affect how data is exchanged with a network. That is, when considering that the reference symbols of the MBSFN is every other tone (as illustrated in the MBSFN subframe structure 300), a fine granularity results in the frequency domain unlike a common reference symbol (CRS) which is every 6 tones before destaggering such as that illustrated in the non-MBSFN reference symbol structure 100. When a high Doppler effect is experienced, the destaggering channel estimation method smears the channel variation over the time and leads to inferior channel estimation results. The exemplary embodiments provide an adaptive manner of selecting a channel estimation method that maximizes the channel estimation results while considering the processing requirements.

Figure 5:
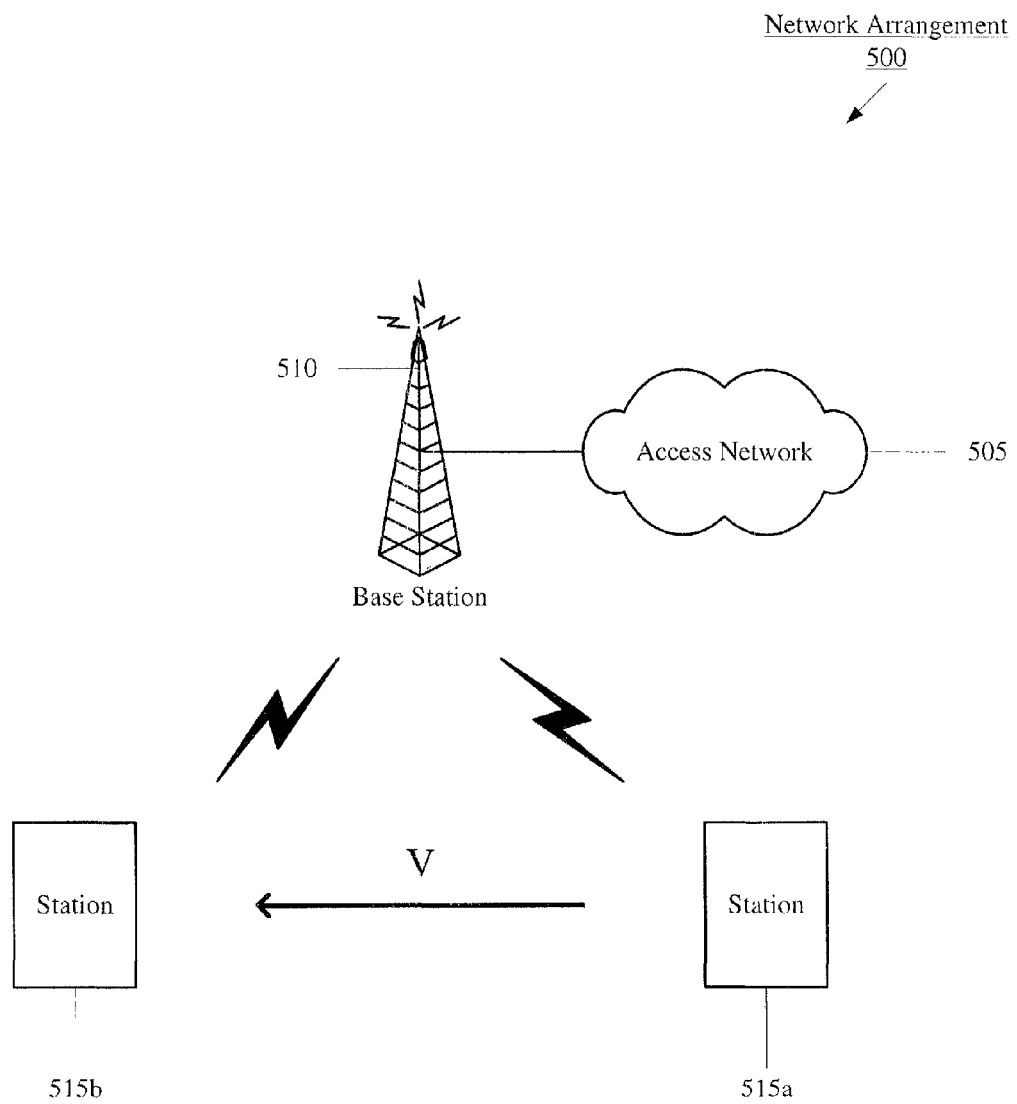
FIG. 5 shows an exemplary network arrangement in which a station experiences rapidly changing channel conditions as measured by a Doppler estimation.

FIG. 5 shows an exemplary network arrangement 500 in which a station 515 experiences rapidly changing channel conditions as measured using a Doppler estimation. For example, the station 515 may move at a velocity V from the position shown in FIG. 5 as station 515a to the position of station 515b. It should be clear that station 515a and 515b is the same station. The illustration of FIG. 5 is showing that the station 515 may be in motion and the result of this motion may be the Doppler effect described above. The network arrangement 500 shows the station 515 communicating with a base station 510 and an access network 505. As described above, the exemplary embodiments are described with reference to an LTE radio access network (LTE-RAN). In an LTE-RAN, the base station 510 may be referred to as an evolved Node B or eNB. Those skilled in the art will understand that an LTE-RAN will have multiple base stations and the illustration of a single base station that is outside the access network is employed for descriptive purposes.

The access network 505, in addition to including additional base stations, may also include a core network, which in an LTE network may be referred to as an evolved packet core (ePC). In addition to multiple other components that may be included in the core network, the ePC may provide the e-MBMS using the MBSFN. Thus, the station 515 may perform a channel estimation using the manners defined for MBSFN such as the destaggered channel estimation. The base station 510 may transmit the MBSFN subframe to the station 515. According to the exemplary embodiments, the station 515 may also be configured to perform the adaptive channel estimation method of determining whether the destaggered channel estimation should be used or a non-destaggered channel estimation should be used based upon a Doppler effect being experienced by the station 515.

Figure 6:
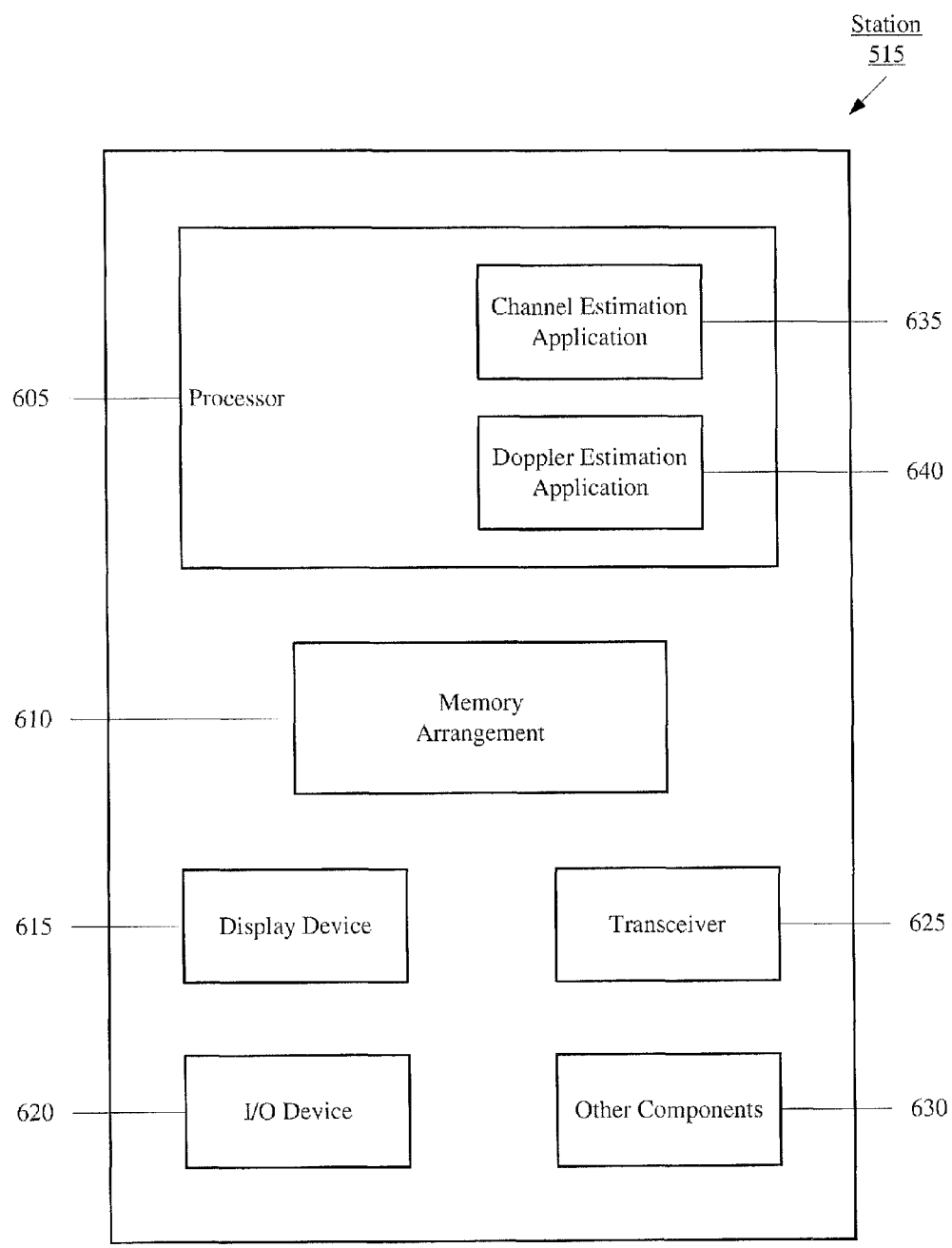
FIG. 6 shows components of the exemplary station of FIG. 5.

FIG. 6 shows components of the exemplary station 615 of FIG. 5. The station 515 may represent any electronic device configured to join the access network 505 via the base station 510 and exchange data therewith. For example, the station 515 may be a portable device such as a cellular phone, a smartphone, a tablet, a phablet, a laptop, etc. The station 515 may include a processor 605, a memory arrangement 610, a display device 615, an input/output (I/O) device 620, a transceiver 625, and other components 630 such as a portable power supply, an audio I/O device, etc.

The processor 605 may be configured to execute a plurality of applications of the station 515. For example, the applications may include a web browser when connected to the access network 505 via the transceiver 625. Thus, data may be exchanged properly when network parameters are determined such as the channel in which the data is transmitted from the base station 510 and received by the station 515. As such and in another example, the applications may include a channel estimation application 635. The channel estimation application 635 may perform the adaptive channel estimation method including the destaggered channel estimation method 300 described above and a non-destaggered channel estimation method that will be described in further detail below. The channel estimation application 635 may select the channel estimation method based upon a Doppler estimate being experienced by the station 515. In a further example, the applications may include a Doppler estimation application 640. The Doppler estimation application 640 may receive various location, spatial, and/or time information of the station 515 and the base station 510. Using this information, the Doppler estimation application 640 may determine the Doppler estimate that is supplied to the channel estimation application 635.

It should be noted that the channel estimation application 635 and the Doppler estimation application 640 being an application (e.g., a program) executed by the processor 605 is only exemplary. In a first example, the processor 605 may be an applications processor or a baseband processor. In another example, the functionality described for the applications may also be represented as a separate incorporated component of the station 515 (e.g., an integrated circuit with or without firmware) or may be a modular component coupled to the station 515. The functionality may also be distributed throughout multiple components of the station 515.

The memory arrangement 610 may be a hardware component configured to store data related to operations performed by the station 515. For example, the memory arrangement 610 may store the information used by the Doppler estimation application 640. The display device 615 may be a hardware component configured to show data to a user while I/O device 620 may be a hardware component configured to receive inputs from the user and output corresponding data such as a hostname request. The other components 630 may include a portable power supply (e.g., battery), a data acquisition device, ports to electrically connect the station 515 to other electronic devices, etc. The other components 630 may further include devices used to measure and determine the information used by the Doppler estimation application 640. For example, an accelerometer may provide velocity information of the station 515. In another example, a location device may provide location information of the station 515. By receiving location information of the base station 510, the Doppler estimation application 640 may be capable of determining the Doppler estimate.

It should be noted that the use of various components to generate the information for the Doppler estimation application 640 is only exemplary. In other embodiments and as discussed above, the Doppler estimation application 640 may be a modular component that couples to the station 515. The modular component may include all the necessary hardware and software for the Doppler estimation application 640 to determine the Doppler estimate. Furthermore, the Doppler estimation application 640 may determine the Doppler estimate based upon information received from further sources such as the base station 510. Thus, the exemplary embodiments may utilize any source (local or remote) for the information to be used in determining the Doppler estimate.

A Doppler effect relates a change in frequency of a signal received by the transceiver 625 of the station 515 moving relative to a source of the signal, which is the transmitter of the base station 510. When the station 515 is in motion such as moving at the velocity V, the frequency at which the transceiver 625 of the station 515 receives the signal is different than the frequency at which the signal is emitted from the transmitter of the base station 510. For example, the base station 510 may emit a signal at a predetermined frequency. However, the frequency of the signal may be higher than the predetermined frequency when the station 515 is moving toward the base station 510 (decreasing a distance). The frequency of the signal may be lower when the station 515 is moving away from the base station 510 (increasing a distance). It should be noted that it may be considered in FIG. 5 that the movement from position 515a to position 515b may be either a movement toward the base station 510 (e.g., decreasing a distance between the station 515 and the base station 510) or a movement away from the base station 510 (e.g., increasing a distance between the station 515 and the base station 510). Thus, when the station 515 is approaching (relatively) the base station 510 (i.e., the source of the signals), the frequency of the signals received by the transceiver 625 is greater than the emitted frequency. When the station 515 is moving away (relatively) from the base station 510, the frequency of the signals received by the transceiver 625 is lower than the emitted frequency. In view of this principle of signal propagation, the channel estimation that is performed using the destaggering channel estimation method 400 may not provide the optimal results when a medium to high Doppler effect is experienced by the station 515.

According to the exemplary embodiments, the channel estimation application 635 is configured to perform the channel estimation using a non-destaggered channel estimation method in order to optimize the results of the channel estimation for MBSFN under the channels with different Doppler shifts. Specifically, when the Doppler estimation application 640 provides a Doppler estimate that is above a predetermined threshold to the channel estimation application 635, the non-destaggered channel estimation method may be used.

In the exemplary embodiments, when the Doppler estimate is below the predetermined threshold as determined by the Doppler estimation application 640, the channel estimation application 635 may perform the destaggered channel estimation method 400 described above. However, when the Doppler estimate is above the predetermined threshold as determined by the Doppler estimation application 640, the channel estimation application 635 may perform the non-destaggered channel estimation method that will be described in greater detail below with reference to FIG. 7.

Figure 7:
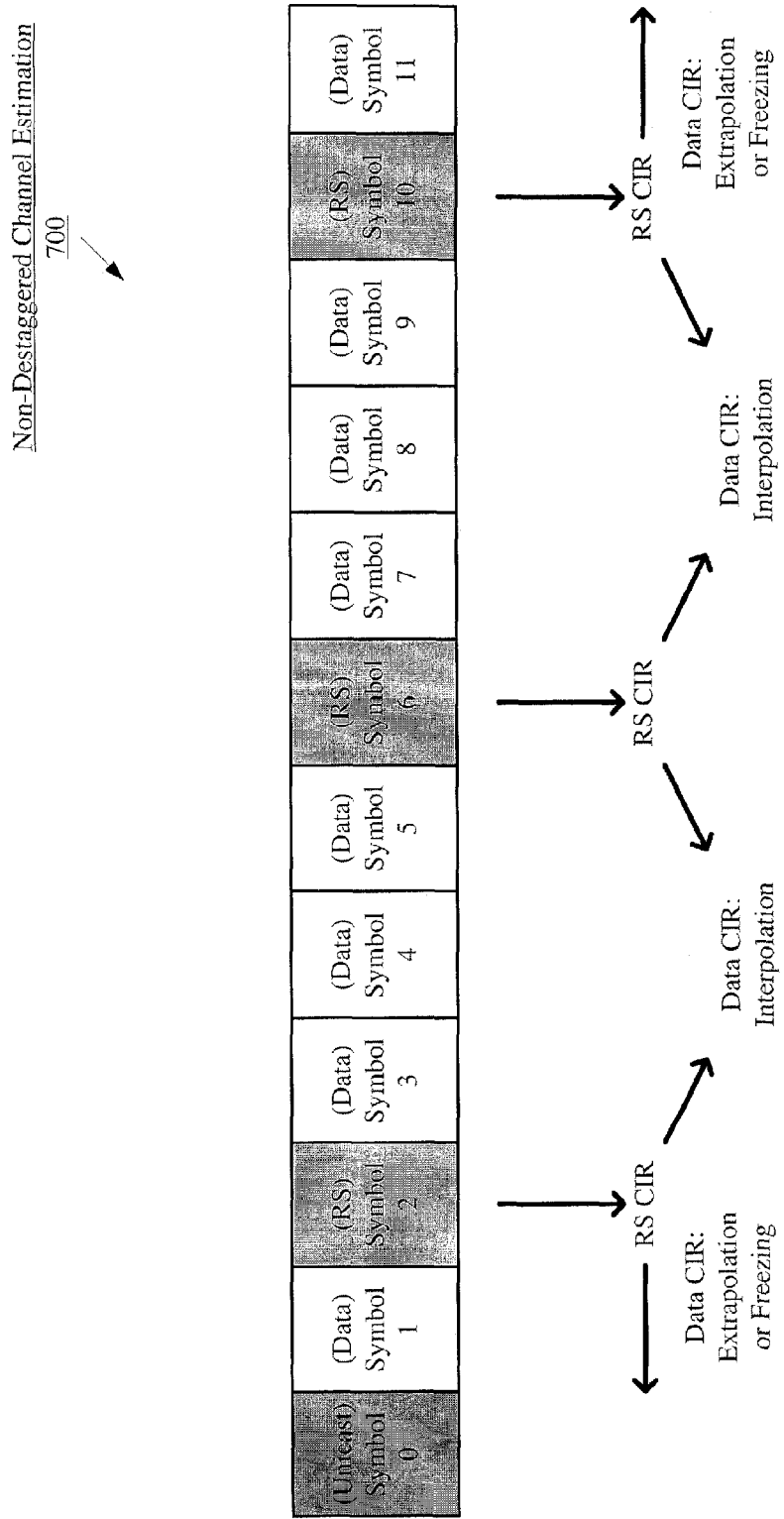
FIG. 7 shows an exemplary adaptive reference symbol channel estimation method.

FIG. 7 shows an exemplary non-destaggered channel estimation method 700. Initially, FIG. 7 illustrates a substantially similar row of OFDM symbols as the destaggered channel estimation method 400. Specifically, twelve OFDM symbols are shown in which the OFDM symbol 0 is for a unicast tone; the OFDM symbols 1, 3-5, 7-9, and 11 are for multicast tones; and OFDM symbols 2, 6, and 10 have reference symbols inserted therein.

In contrast to the destaggered channel estimation method 400 that uses the CIRs of the OFDM symbols 4 and 8, the non-destaggered channel estimation method 700 utilizes the CIRs measured directly at the OFDM symbols having the reference symbols inserted. Specifically, the CIRs of OFDM symbols 2, 6, and 10 are used. Thus, the channel estimation may be performed using extrapolation or freezing for OFDM symbol 1 using the CIR of the OFDM symbol 2 and for OFDM symbol 11 using the CIR of the OFDM symbol 10. In view of an extra CIR being used, an additional interpolation is performed. Specifically, the channel estimation may be performed using interpolation for OFDM symbols 3-5 using the CIRs of OFDM symbols 2 and 6 and for OFDM symbols 7-9 using the CIRs of OFDM symbols 6 and 10. Again, using these CIRs directly at the OFDM symbols including the reference symbols provides improved results for channel estimation in MBSFN when the station 515 experiences a Doppler effect that is greater than a predetermined threshold.

The additional processing that is used to perform the non-destaggered channel estimation provides better results (particularly better extrapolation performance) considering that the channel varies fast with a medium to high Doppler effect and the density of MBSFN reference symbol tones provides enough estimation accuracy in the frequency domain.

Figure 8:
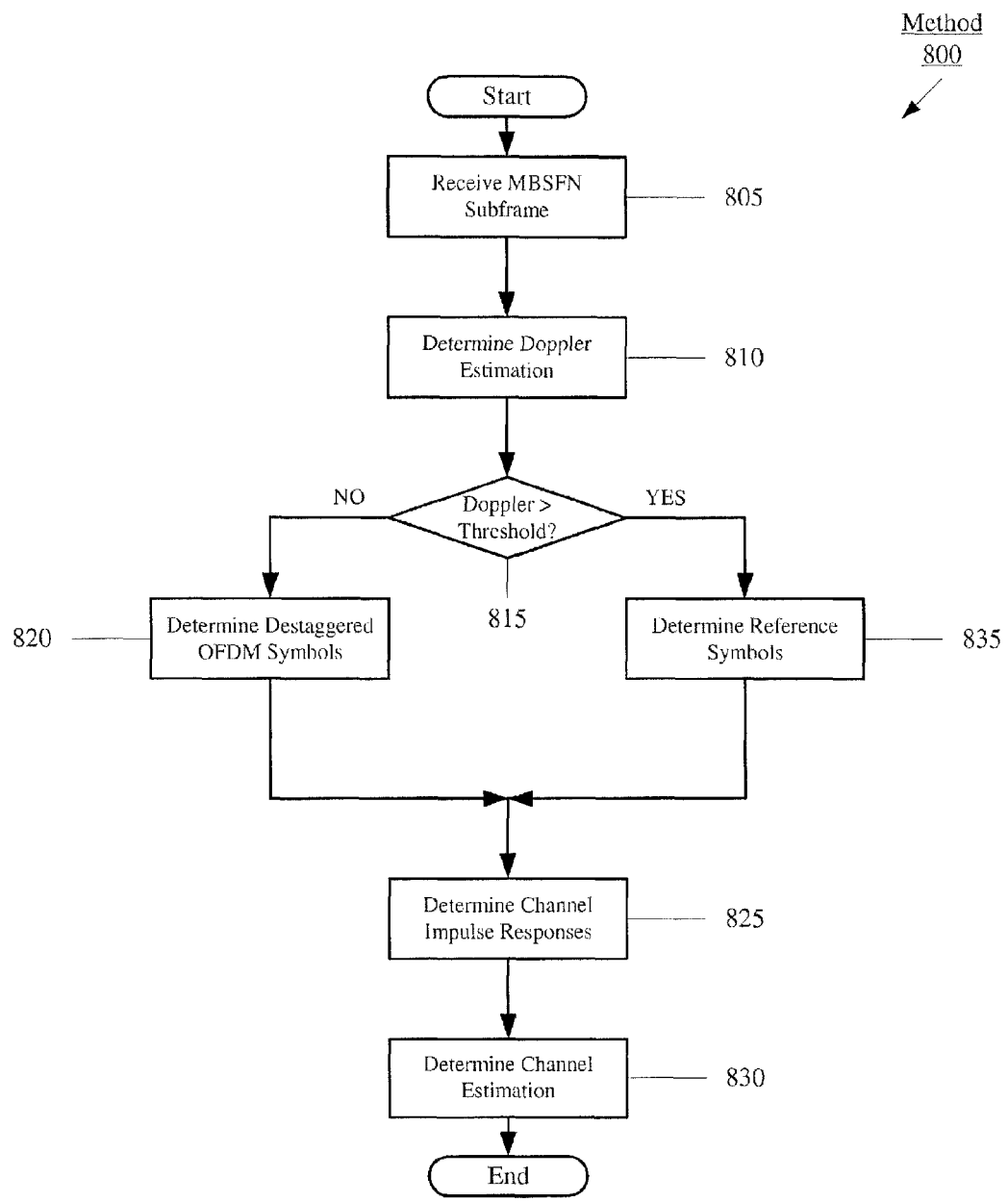
FIG. 8 shows an exemplary method for channel estimation based rapidly changing channel conditions as measured by a Doppler estimation.

FIG. 8 shows an exemplary method 800 for channel estimation based upon a Doppler effect. The method 800 may be performed by the station 515 when connected to an LTE-RAN and utilizing the MBSFN. The station 515 may also be in motion and experiencing a Doppler effect. The method 800 will be described with regard to the network arrangement 500 of FIG. 5, the components of the station 515 shown in FIG. 6, the destaggered channel estimation method 400 of FIG. 4, and the non-destaggered channel estimation method 700 of FIG. 7.

In step 805, the channel estimation application 635 of the station 515 receives the MBSFN subframe. For example, the received MBSFN subframe may be substantially similar to the MBSFN subframe structure 300 having a unicast region and a multicast region. As discussed above, the MBSFN may utilize an antenna port 4 such that the reference symbols inserted in the MBSFN subframe structure 300 include reference symbol tones R4. More specifically, as shown in the row of OFDM symbols of FIGS. 4 and 7, the OFDM symbol 0 may be a unicast tone; the OFDM symbols 1, 3-5, 7-9, and 11 may be multicast tones; and the OFDM symbols 2, 6, and 10 may have reference symbols R4 inserted therein.

In step 810, the Doppler estimation application 640 determines a Doppler estimate. As described above, the Doppler estimate may be determined using a variety of different manners such as utilizing local components (e.g., accelerometer), remote components (e.g., sources such as the base station 510), and any information that is received or otherwise determined. For example, as shown in the network arrangement 500 of FIG. 5, the station 515 may be moving at a velocity V from a position at station 515a to a position at station 515b. This velocity V may be measured with the accelerometer, a location of the station 515 and its movement may be measured or received, and a static location of the base station 510 may be received. Using this information, the Doppler estimation application 640 may determine the Doppler estimate. Thus, depending on this information, the Doppler estimate may be determined to be low, medium, or high relative to a predetermined threshold. For example, the predetermined threshold may be for a relatively medium Doppler effect such as 70 Hz. An exemplary range of predetermined thresholds may be between 50-100 Hz.

It should be noted that the Doppler estimate may be leveraged from the CRS Doppler estimate considering it mainly reflects the movements of the station 515. Although the MBSFN and CRS may be from different base stations such that the channel estimates may not be directly leveraged, the Doppler estimate may be directly leveraged as it is a relative property of the station 515. Moreover, as described above, the Doppler estimate is a proxy for indicating that the station 515 is experiencing rapidly changing channel conditions such that a non-destaggered channel estimation should be performed. These rapidly changing channel conditions may also be determined in different manners that do not include Doppler estimates.

In step 815, the channel estimation application 635 receives the Doppler estimate from the Doppler estimation application 640 and determines whether the Doppler estimate is greater than the predetermined threshold. As described above, the predetermined threshold may relate to a Doppler value in which channel estimation results from using the destaggered channel estimation method 400 may be sub-optimal. For example, the predetermined threshold may be 70 Hz, which corresponds to a medium Doppler effect.

If the Doppler estimate is below or less than the predetermined threshold, the channel estimation application 635 continues the method 800 to step 820 in which the destaggered channel estimation method 400 may be used. Specifically, when the station 515 is stationary or experiences a low Doppler effect, the frequency at which signals are transmitted from the base station 510 may not be substantially different from the frequency at which these signals are received by the transceiver 625 of the station 715. Accordingly, the destaggered channel estimation method 400 may still provide appropriate channel estimate results.

Thus, in step 820, the channel estimation application 635 determines that the reference symbols are inserted at OFDM symbols 2, 6, and 10 such that the destaggered OFDM symbols used in the destaggered channel estimation application method 400 are OFDM symbols 4 and 8. In step 825, the channel estimation application 635 determines the CIRs at the OFDM symbols 4 and 8. In step 830, the channel estimation application 635 performs the channel estimation based upon the CIRs of the OFDM symbols 4 and 8. That is, the destaggered channel estimation method 400 is performed. Accordingly, channel estimation is performed using extrapolation or freezing for OFDM symbols 1-3 using the CIR of the OFDM symbol 4 and for OFDM symbols 9-11 using the CIR of the OFDM symbol 8. Channel estimation is performed using interpolation for OFDM symbols 5-7 using the CIRs of the OFDM symbols 4 and 8.

Returning to step 815, if the Doppler estimate is greater than the predetermined threshold, the channel estimation application 635 continues the method 800 to step 835 in which the OFDM symbols including the reference symbols are determined. That is, the non-destaggered channel estimation method 700 may be used. Specifically, when the station 515 is moving or experiences a medium or high Doppler effect, the frequency at which signals are transmitted from the base station 510 may be substantially different from the frequency at which these signals are received by the transceiver 625 of the station 515. Accordingly, the non-destaggered channel estimation method 700 may provide improved channel estimate results.

Thus, in step 835, the channel estimation application 635 determines that the reference symbols are inserted at OFDM symbols 2, 6, and 10. In step 825, the channel estimation application 835 determines the CIRs at the OFDM symbols 2, 6, and 10. In step 830, the channel estimation application 635 performs the channel estimation based upon the CIRs of the OFDM symbols 2, 6, and 10. That is, the non-destaggered channel estimation method 700 is performed. Accordingly, channel estimation is performed using extrapolation or freezing for OFDM symbol 1 using the CIR of the OFDM symbol 2 and for OFDM symbol 11 using the CIR of the OFDM symbol 10. Channel estimation is performed using interpolation for OFDM symbols 3-5 using the CIRs of the OFDM symbols 2 and 6 and for OFDM symbols 7-9 using the CIRs of the OFDM symbols 6 and 10.

Thus, the method 800 illustrates an adaptive manner of performing channel estimation for a subframe. When the Doppler effect on the station receiving the signal is relatively low, a destaggered channel estimation may be performed. However, when the Doppler effect is determined to be relatively high, a non-destaggered channel estimation may be performed. This adaptive manner of performing channel estimation provides a good trade-off between resource use (e.g., the destaggered method of channel estimation uses less power and processing resources) and accuracy (e.g., the non-destaggered method of channel estimation provides better results) based on the Doppler effect that the station is experiencing.

As described above, the exemplary embodiments are not limited to MBSFN subframes. The non-destaggered channel estimation method 700 may be used in further scenarios. For example, in the scenario of a special subframe (SSF) for Time-Division LTE (TD-LTE), a lesser number of reference symbols are used compared to regular downlink subframes. Thus, the non-destaggered channel estimation method 700 may be an appropriate channel estimation method for these types of subframes. In the same manner as described above for the MBSFN subframes, the destaggered channel estimation using CIRs at the OFDM symbols having reference symbols inserted may be used for high Doppler effects to improve the SSF performance in view of the similarities of the properties in the MBSFN subframe structure 300 (e.g., high density of reference symbols). That is, the channel estimation may be performed using the CRS channel estimation from three available CRSs directly without destaggering.

The exemplary embodiments provide a station and method to perform an adaptive channel estimation for a subframe (e.g., a MBSFN of a LTE network based upon a Doppler effect). Given the manner in which reference symbols are inserted into a MBSFN subframe structure and the resulting density thereof, the Doppler effect may smear the channel variation over time and lead to inferior channel estimation results. Particularly, when a Doppler effect above a predetermined threshold (e.g., medium to high value) is experienced by the station, there is a sub-optimal result for channel estimation. Thus, the exemplary embodiments provide a mechanism to determine a Doppler estimate to be compared to the predetermined threshold and utilize a destaggered channel estimation method when below this predetermined threshold or a non-destaggered channel estimation method when above this predetermined threshold. In this manner, the results of the channel estimation may be optimal even when the station is in motion and experiences a Doppler effect.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
   at a station configured to connect to a Long Term Evolution radio access network (LTE-RAN) to utilize enhanced Multimedia Broadcast Multicast Services (e-MBMS) using a Multicast-Broadcast Single-Frequency Network (MBSFN),
      receiving a MBSFN subframe from an evolved NodeB (eNB) of the LTE-RAN, the MBSFN subframe having a MBSFN subframe structure including a plurality of Orthogonal Frequency-Division Multiplexing (OFDM) symbols, a first one of the OFDM symbols having a first reference symbol inserted therein, a second one of the OFDM symbols having a second reference symbol inserted therein;
      determining a rate of change of channel conditions being experienced by the station on a channel that the station is receiving a signal including the MBSFN subframe from the eNB; and
      performing a non-destaggered channel estimation when the rate of change of channel conditions is greater than a predetermined threshold, the non-destaggered channel estimation using a first Channel Impulse Response (CIR) at the first OFDM symbol and a second CIR at the second OFDM symbol.

2. The method of claim 1, wherein the determining the rate of change of channel conditions includes determining a Doppler estimate of the station, the Doppler estimate corresponding to an altered frequency at which the signal is received.

3. The method of claim 1, wherein the plurality of OFDM symbols of the MBSFN subframe structure includes a third one of the OFDM symbols having a third reference symbol inserted therein.

4. The method of claim 3, wherein the non-destaggered channel estimation further uses a third CIR at the third OFDM symbol.

5. The method of claim 4, wherein the non-destaggered channel estimation includes one of extrapolation and freezing for the OFDM symbols outside the first and third OFDM symbols having the reference symbols and interpolation for the OFDM symbols between the first and second OFDM symbols having the reference symbols and between the second and third OFDM symbols having the reference symbols.

6. The method of claim 1, further comprising:
   receiving a second MBSFN subframe from the eNB of the LTE-RAN, the second MBSFN subframe including a second plurality of OFDM symbols, a first one of the second plurality of OFDM symbols having a first reference symbol inserted therein, a second one of the second plurality of OFDM symbols having a second reference symbol inserted therein;
   performing a destaggered channel estimation for the second MBSFN subframe when the rate of change of channel conditions is less than the predetermined threshold, the destaggered channel estimation using a first CIR at a third one of the second plurality of OFDM symbols that is between the first one and second one of the second plurality of OFDM symbols.

7. The method of claim 6, wherein the second MBSFN subframe includes a fourth one of the second plurality of OFDM symbols having a third reference symbol inserted therein, wherein the destaggered channel estimation further uses a second CIR at a fifth one of the second plurality of OFDM symbols that is between the second one and the fourth one of the second plurality of OFDM symbols.

8. The method of claim 7, wherein the destaggered channel estimation includes one of extrapolation and freezing for the OFDM symbols outside the third one and fifth one of the second plurality of OFDM symbols and interpolation for the OFDM symbols between the third one and the fifth one of the second plurality of OFDM symbols.

9. The method of claim 1, wherein the MBSFN subframe has an extended cyclic prefix resulting in a high density of the reference symbols in the MBSFN subframe structure.

10. A station, comprising:
    a transceiver configured to establish a connection to an access network; and
    a processor,
    wherein the processor and transceiver are configured to perform a channel estimation by:
       receiving a subframe from a base station of the access network, the subframe including a plurality of symbols, a first one of the symbols having a first reference symbol inserted therein, a second one of the symbols having a second reference symbol inserted therein;
       receiving a rate of change of channel conditions for a channel on which the station is receiving the subframe from the base station;
       performing a non-destaggered channel estimation when the rate of change of channel conditions is greater than a predetermined threshold, the non-destaggered channel estimation using a first Channel Impulse Response (CIR) at the first symbol and a second CIR at the second symbol; and
       performing a destaggered channel estimation when the rate of change of channel conditions is less than the predetermined threshold, the destaggered channel estimation using a third CIR at a third symbol, the third symbol being between the first and second symbols.

11. The station method of claim 10, wherein the rate of change of channel conditions includes determining a Doppler estimate for the station.

12. The station of claim 10, further comprising:
    an accelerometer determining a Doppler estimate of the station.

13. The station of claim 10, wherein the subframe is one of a Multicast-Broadcast Single-Frequency Network (MBSFN) subframe or a special subframe (SSF) for Time-Division LTE (TD-LTE).

14. The station of claim 10, wherein the third symbol is a data symbol.

15. The station of claim 10, wherein a fourth one of the plurality of symbols is a unicast symbol.

16. The station of claim 10, wherein performing the non-destaggered channel estimation is further based on a density of reference symbols in the subframe.

17. The station of claim 10, wherein the rate of change of channel conditions is based on at least one additional subframe having a common reference symbol (CRS) structure that is different from the subframe.

18. A non-transitory computer readable storage medium with an executable program stored thereon, wherein the program instructs a microprocessor to perform operations comprising:
    receiving a Multicast-Broadcast Single-Frequency Network (MBSFN) subframe from an evolved NodeB (eNB) of a Long Term Evolution radio access network (LTE-RAN), the MBSFN subframe having a MBSFN subframe structure including a plurality of Orthogonal Frequency-Division Multiplexing (OFDM) symbols, a first one of the OFDM symbols having a first reference symbol inserted therein, a second one of the OFDM symbols having a second reference symbol inserted therein;
    determining a rate of change of channel conditions being experienced by the station on a channel that the station is receiving a signal including the MBSFN subframe from the eNB; and
    performing a non-destaggered channel estimation when the rate of change of channel conditions is greater than a predetermined threshold, the non-destaggered channel estimation using a first Channel Impulse Response (CIR) at the first OFDM symbol and a second CIR at the second OFDM symbol.

19. The non-transitory computer readable storage medium of claim 18, wherein the program instructs the microprocessor to perform operations comprising:
    receiving a second MBSFN subframe from the eNB of the LTE-RAN, the second MBSFN subframe including a second plurality of OFDM symbols, a first one of the second plurality of OFDM symbols having a first reference symbol inserted therein, a second one of the second plurality of OFDM symbols having a second reference symbol inserted therein;
    performing a destaggered channel estimation for the second MBSFN subframe when the rate of change in channel conditions is less than the predetermined threshold, the destaggered channel estimation using a first CIR at a third one of the second plurality of OFDM symbols that is between the first one and second one of the second plurality of OFDM symbols.

20. The non-transitory computer readable storage medium of claim 18, wherein, when determining the rate of change of channel conditions, the program instructs the microprocessor to perform operations comprising:
    determining a Doppler estimate of the station, the Doppler estimate corresponding to an altered frequency at which the signal is received.

* * * * *